(12) United States Patent
Hung et al.

(10) Patent No.: US 9,377,154 B2
(45) Date of Patent: Jun. 28, 2016

(54) BRACKET FOR SUPPORTING ELECTRONIC DEVICE

(71) Applicant: HON HAI PRECISION INDUSTRY CO., LTD., New Taipei (TW)

(72) Inventors: Chih-Wei Hung, New Taipei (TW); Yi-Heng Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 82 days.

(21) Appl. No.: 14/085,655

(22) Filed: Nov. 20, 2013

(65) Prior Publication Data
US 2015/0076308 A1 Mar. 19, 2015

(30) Foreign Application Priority Data
Sep. 13, 2013 (TW) .............................. 102133110 A

(51) Int. Cl.
*F16M 11/04* (2006.01)
*F16M 11/10* (2006.01)
*F16M 11/16* (2006.01)
*F16M 13/00* (2006.01)
*A47B 97/00* (2006.01)

(52) U.S. Cl.
CPC .............. *F16M 11/046* (2013.01); *A47B 97/00* (2013.01); *F16M 11/105* (2013.01); *F16M 11/16* (2013.01); *F16M 13/00* (2013.01); *A47B 2097/005* (2013.01); *F16M 2200/028* (2013.01)

(58) Field of Classification Search
CPC ... F16M 11/046; F16M 11/06; F16M 11/105; F16M 11/16; F16M 13/00; F16M 2200/028

USPC .................. 428/450, 458, 130, 161, 407, 423
See application file for complete search history.

(56) References Cited

U.S. PATENT DOCUMENTS

| 1,071,428 | A  | * | 8/1913 | Jones | A47B 23/042 139/88 |
| 6,209,840 | B1 | * | 4/2001 | Chen | A47C 1/03 248/118 |
| 6,418,010 | B1 | * | 7/2002 | Sawyer | B60R 11/0235 248/918 |
| 7,296,855 | B1 | * | 11/2007 | Link | A47C 7/402 248/423 |
| 7,301,759 | B2 | * | 11/2007 | Hsiung | H05K 5/0234 248/188 |
| 7,686,275 | B2 | * | 3/2010 | Scarcello | A47G 1/24 248/231.91 |
| 8,056,870 | B2 | * | 11/2011 | Chih | F16M 11/24 248/157 |

(Continued)

FOREIGN PATENT DOCUMENTS

| CN | 1767740 A | 5/2006 |
| TW | M411500 U1 | 9/2011 |
| TW | 201212792 A1 | 3/2012 |

*Primary Examiner* — Ryan Kwiecinski
(74) *Attorney, Agent, or Firm* — ScienBiziP, P.C.

(57) ABSTRACT

A bracket for supporting a portable electronic device is disclosed. The bracket includes a base, a housing receiving the portable electronic device and an arm connecting the base with the housing. The arm defines a slot which has a plurality of teeth arranged along a lengthwise direction thereof. A connector extends through the slot of the arm into the housing. The connector has two elastic tabs movably engaging with the teeth to thereby position the housing at different heights of the arm.

16 Claims, 5 Drawing Sheets

(56) References Cited

U.S. PATENT DOCUMENTS

| | | | |
|---|---|---|---|
| 2010/0213331 A1* | 8/2010 | Liou | F16M 11/10 248/176.3 |
| 2012/0170194 A1* | 7/2012 | Lord | G06F 1/1632 361/679.02 |
| 2012/0236475 A1* | 9/2012 | Peng | F16M 11/105 361/679.01 |
| 2012/0241567 A1* | 9/2012 | Gillespie-Brown | B60R 11/00 248/122.1 |
| 2012/0275094 A1* | 11/2012 | Zhou | H04M 1/04 361/679.01 |
| 2013/0009031 A1* | 1/2013 | Cheng | F16M 13/00 248/371 |
| 2013/0075543 A1* | 3/2013 | Krohn | G06F 1/1632 248/121 |
| 2013/0146726 A1* | 6/2013 | Bobrow | F16M 13/02 248/230.1 |
| 2014/0001086 A1* | 1/2014 | Liu | G06F 1/16 206/736 |
| 2014/0183314 A1* | 7/2014 | Mulhern | F16M 13/022 248/288.11 |
| 2014/0332418 A1* | 11/2014 | Cheung | F16M 11/10 206/45.2 |
| 2014/0347795 A1* | 11/2014 | Baca | H01F 7/0252 361/679.01 |
| 2015/0041622 A1* | 2/2015 | Mulhern | F16M 11/041 248/688 |
| 2015/0103057 A1* | 4/2015 | Lei | F16M 13/00 345/179 |

* cited by examiner

BRACKET FOR SUPPORTING ELECTRONIC DEVICE

BACKGROUND

1. Technical Field

The disclosure generally relates to brackets, and more particularly to a bracket for supporting an electronic device.

2. Description of Related Art

Nowadays portable electronic devices are used widely for displaying texts, images or videos. Sometimes the user wants to watch the displaying content of the portable electronic device for a long time, the portable electronic device is thus required to place on a support (such as a table or a desk) by a bracket. However, the typical bracket can only adjust the displaying orientation of the portable electronic device, the height of the portable electronic device is unchangeable.

What is needed, therefore, is a bracket for supporting an electronic device which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
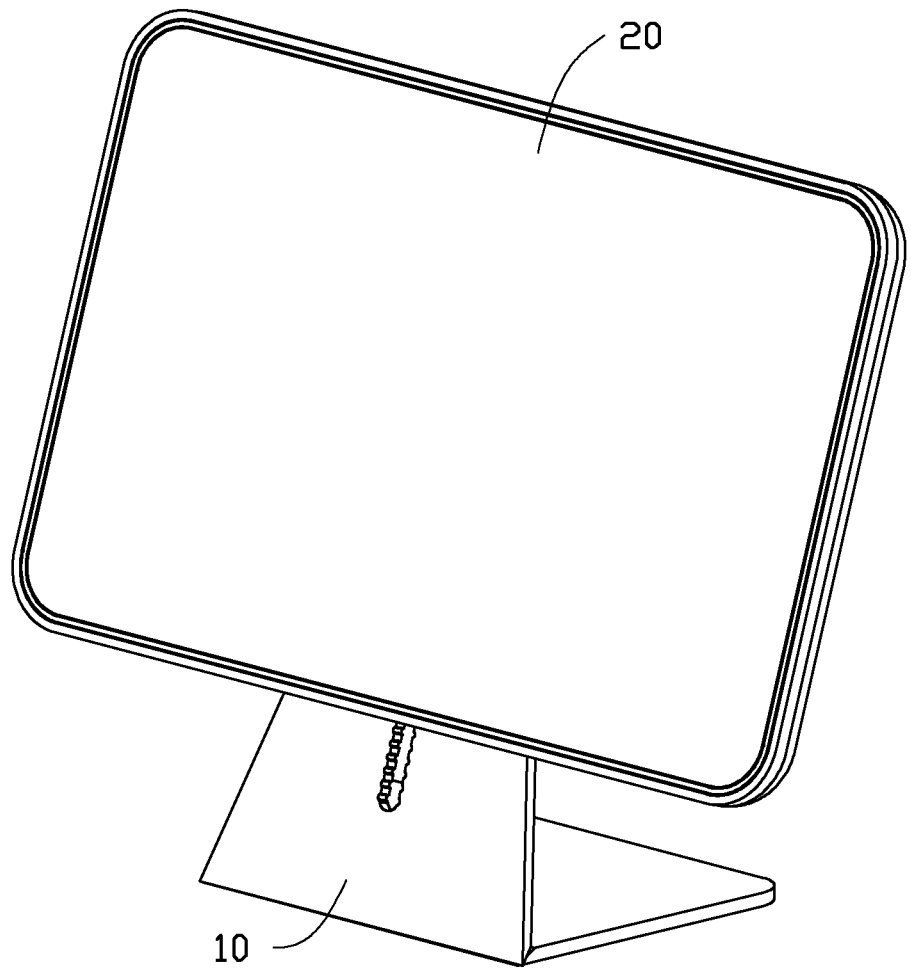
FIG. 1 shows a bracket in accordance with an embodiment of the present disclosure.
Figure 2:
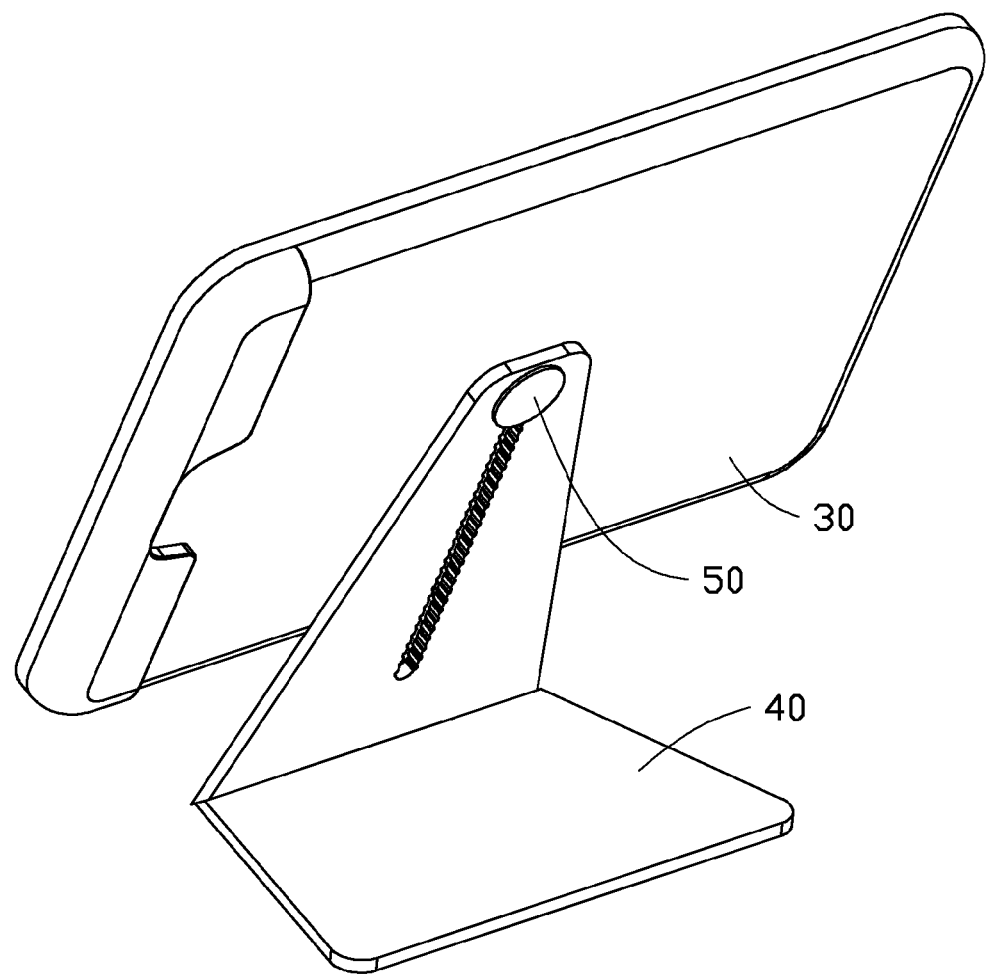
FIG. 2 shows the bracket of FIG. 1 from another aspect.

Referring to FIGS. 1-2, a bracket 10 in accordance with an embodiment of the present disclosure is shown. The bracket 10 includes a housing 30, a support 40 and a connector 50 connecting the housing 30 with the support 40.

Figure 3:
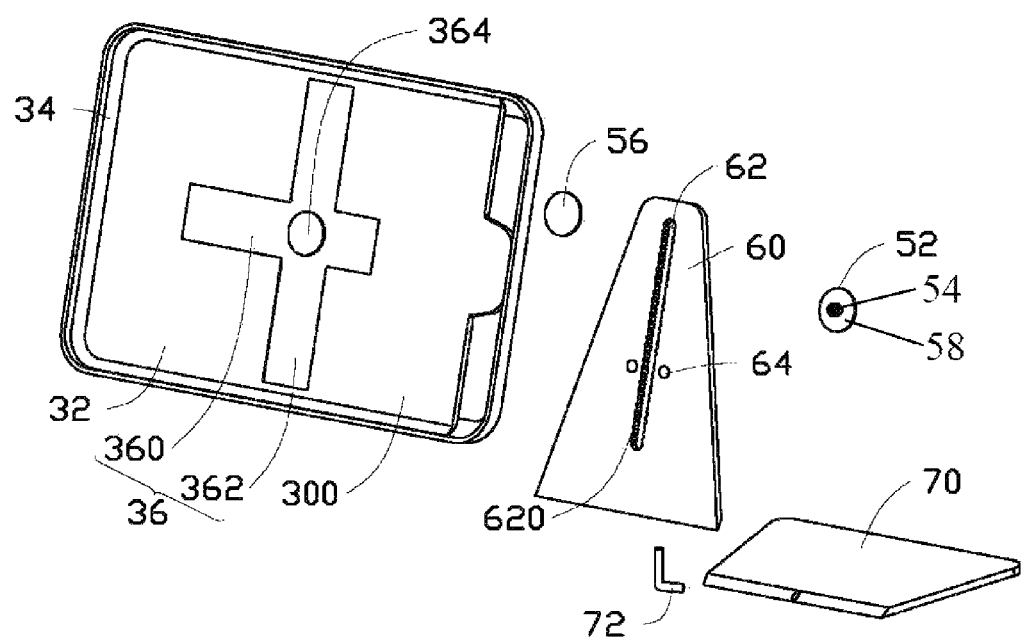
FIG. 3 is an exploded view of the bracket of FIG. 1.
Figure 4:
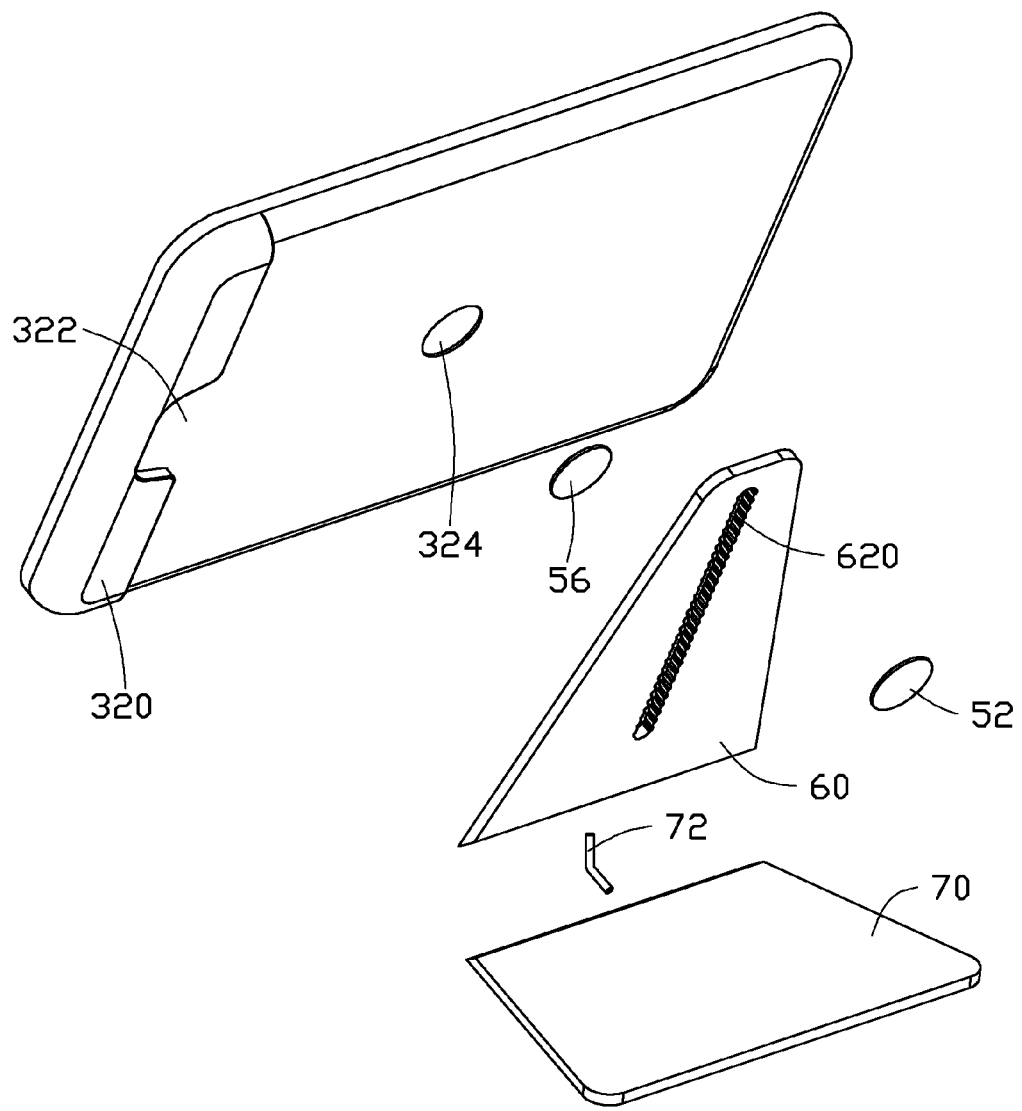
FIG. 4 shows the bracket of FIG. 3 from another aspect.

Also referring to FIGS. 3-4, the housing 30 is used for receiving a portable electronic device 20, such as mobile phone, electronic pad, video player or the like. The housing 30 includes a plate 32 and a plurality of sidewalls 34 extending from a periphery of the plate 32. The plate 32 is rectangular and flat. The sidewalls 34 and the plate 32 cooperatively enclose a chamber 300 for receiving the portable electronic device 20. A positioning structure 36 is formed on a front face of the plate 32. The positioning structure 36 can be attracted by a magnetic force to position the housing 30 in different directions. The positioning structure 36 includes a first strip 360 and a second strip 362 crossed with the first strip 360. The first strip 360 and the second strip 362 may be made of iron. The first strip 360 is parallel to a long edge of the plate 32, and the second strip 362 is parallel to a short edge of the plate 32. The first strip 360 is perpendicular to the second strip 362. The first strip 360 is short than the second strip 362. The first strip 360 and the second strip 362 intersect at a joint 364. A protrusion 320 is formed on a rear face of the plate 32. The protrusion 320 forms a cutout 322 in a central area thereof for receiving the arm 60. A circular depression 324 is formed in a center of the rear face of the plate 32. The circular depression 324 is aligned with the joint 364 of the first strip 360 and the second strip 362.

The support 40 includes an arm 60 and a base 70 connected to the arm 60. The arm 60 has a trapezoid shape with a width gradually increasing from a top to a bottom thereof. The arm 60 defines a slot 62 along a height thereof. The slot 62 has a plurality of teeth 620 arranged along a lengthwise direction thereof. Two magnetic elements 64 are attached on a front face of the arm 60. The two magnetic elements 64 are located at two opposite sides of the slot 62, respectively. A distance between the two magnetic elements 64 is less than a width of each of the first strip 360 and the second strip 362. The two magnetic elements 64 are located adjacent to the slot 62. The two magnetic elements 64 can produce the magnetic force to attract each of the first strip 360 and the second strip 362.

Figure 5:
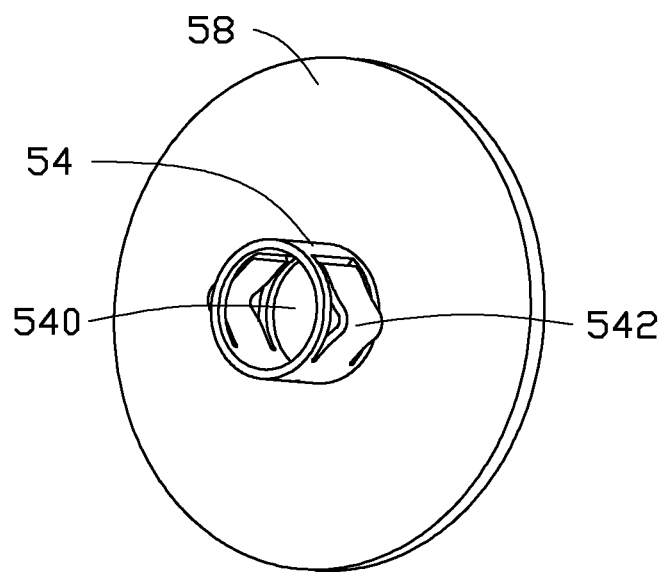
FIG. 5 shows an enlarged nut of the bracket of FIG. 3.

Also referring to FIG. 5, the connector 50 includes a cover 56 and a nut 52 fixed to the cover 56. The cover 56 is a circular tab having a size slightly less than that of the depression 324. The cover 56 is rotatably embedded in the depression 324 without being dropped out of the depression 324. The nut 52 includes a circular chassis 58 and a tube 54 extending from the chassis 58 towards the housing 30. The chassis 58 has an area equal to that of the cover 56. The chassis 58 presses against a rear face of the arm 60, and the cover 56 presses against the front face of the arm 60, whereby the arm 60 is sandwiched between the cover 56 and the chassis 58. The tube 54 is formed on a central area of the chassis 58. The tube 54 is hollow and defines a hole 540 therein. Two tabs 542 protrude outwardly from two opposite sides of the tube 54, respectively. Each tab 542 is bended and has a V shape. In this embodiment, the two tabs 542 and the tube 54 are made of a single monolithic piece of elastic material such as rubber, plastic or the like. The tube 54 extends through the slot 62 to connect the cover 56. The two tabs 542 elastically and interferingly abut against the teeth 620 of the slot 62. The two tabs 542 can move downwardly or upwardly in the slot 62 to interferingly engage with different teeth 620, whereby the portable electronic device 20 received in the housing 30 can be brought by the connector 50 at different heights as desired. Thus, a user can freely adjust the height of the portable electronic device 20 by the bracket 10.

Furthermore, since the cover 56 is rotatably received in the depression 324 of the housing 30, the housing 30 can be freely rotated about the connector 50 in a plane parallel to the plate 32. During rotation of the housing 30 about the connector 50, the two magnetic elements 64 can attract the positioning structure 36, thereby further positioning the housing 30 at two different directions. For example, when the housing 30 is rotated to a horizontal direction, the two magnetic elements 64 are aligned with the second strip 362 to thereby attract the second strip 362. Therefore, the housing 30 is forced by the two magnetic elements 64 to the horizontal direction. When the housing 30 is rotated to a vertical direction, the two magnetic elements 64 are aligned with the first strip 360 to thereby attract the first strip 360. Therefore, the housing 30 is forced by the two magnetic elements 64 to the vertical direction.

The base 70 is connected to a bottom of the arm 60 by a bendable shaft 72. The base 70 can be disposed on a flat surface (such as a desk or a table) for supporting the housing 30. The base 70 can be folded with the arm 60 by bending the shaft 72, thereby facilitating transportation of carry of the bracket 10. In use, the base 70 is brought to be away from the arm 60 so that an acute angle is defined between the base 70 and the arm 60. By bending the shaft 72, the angle between the base 70 and the arm 60 can be adjusted, whereby the portable electronic device 20 can be watched at a desired orientation.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A bracket for supporting a portable electronic device comprising:
   a base;
   a housing;
   an arm connecting the base with the housing, the arm defining a slot, the slot having a plurality of teeth arranged along a height of the arm; and
   a connector extending through the slot of the arm into the housing, the connector comprising a tube having an elastic tab movably engaging with the teeth to position the housing at different heights of the arm, and a chassis and a cover connecting two opposite ends of the tube;
   wherein the elastic tab is bent from the tube and the arm is sandwiched between the chassis and the cover.

2. The bracket of claim 1, wherein the elastic tab has a V shape.

3. The bracket of claim 1, wherein the cover is rotatably embedded within the housing.

4. The bracket of claim 3, wherein the housing comprises a plate defining a depression, the cover being received in the depression.

5. The bracket of claim 4, wherein the plate further forms a protrusion on a rear face of the plate, the protrusion defining a cutout for receiving the arm.

6. The bracket of claim 1, wherein the housing comprises a positioning structure, the arm has a magnetic element attracting the positioning structure.

7. The bracket of claim 6, wherein the positioning structure comprises a first strip and a second strip intersecting the first strip, the magnetic element attracting one of the first strip and the second strip.

8. The bracket of claim 7, wherein the first strip has a length less than that of the second strip.

9. The bracket of claim 7, wherein the connector is aligned with a joint of the first strip and the second strip.

10. The bracket of claim 6, wherein the magnetic element is located adjacent to the slot.

11. The bracket of claim 1, wherein the arm has a width gradually increasing in a direction towards the base.

12. The bracket of claim 1, wherein the base is rotatably connected to the arm.

13. The bracket of claim 12, wherein the base is connected to the arm by a bendable shaft.

14. The bracket of claim 12, wherein the base is foldable with the arm.

15. A bracket for supporting a portable electronic device comprising:
   a base;
   a housing comprising a positioning structure, the positioning structure comprising a first strip and a second strip intersecting the first strip;
   an arm connecting the base with the housing, the arm having a magnetic element attracting the positioning structure, the arm defining a slot, the slot having a plurality of teeth arranged along a height of the arm; and
   a connector extending through the slot of the arm into the housing, the connector comprising an elastic tab movably engaging with the teeth to position the housing at different heights of the arm;
   wherein the magnetic element is configured to be aligned with the first strip or the second strip, when the magnetic element is aligned with the first strip and attracted to the first strip, the housing is forced by the magnetic element to a first orientation, when the magnetic element is aligned with the second strip and attracted to the second strip, the housing is forced by the magnetic element to a second orientation different with the first orientation.

16. A bracket for supporting a portable electronic device comprising:
   a base;
   a housing comprising a positioning structure, the positioning structure comprising a first strip and a second strip intersecting the first strip;
   an arm connecting the base with the housing, the arm having a magnetic element attracting the positioning structure, the arm defining a slot, the slot having a plurality of teeth arranged along a height of the arm; and
   a connector extending through the slot of the arm into the housing, the connector comprising an elastic tab movably engaging with the teeth to position the housing at different heights of the arm;
   wherein the magnetic element is configured to attract one of the first strip and the second strip to make the housing be positioned in different orientation, and
   wherein the first strip has a length less than that of the second strip.

* * * * *